United States Patent [19]

Kenyon et al.

[11] 4,137,167
[45] Jan. 30, 1979

[54] REMOVAL OF MOISTURE FROM A SLUDGE SLURRY OR THE LIKE

[75] Inventors: Jack Kenyon, Goostrey; Herbert M. Heaton, Whaley Bridge, both of England

[73] Assignee: The Moseley Rubber Company Limited, Manchester, England

[21] Appl. No.: 761,244

[22] Filed: Jan. 21, 1977

[30] Foreign Application Priority Data

Jan. 23, 1976 [GB] United Kingdom ............... 2617/76

[51] Int. Cl.² .......................................... B01D 25/12
[52] U.S. Cl. .................................... 210/81; 210/225; 210/230
[58] Field of Search ............... 210/224, 225, 227–231, 210/344, 79, 81; 100/37, 113, 198, 199

[56] References Cited

U.S. PATENT DOCUMENTS

| | | | |
|---|---|---|---|
| 3,270,887 | 9/1966 | Juhasz et al. | 210/230 X |
| 3,583,566 | 6/1971 | Meshengisser et al. | 210/230 X |
| 3,624,778 | 11/1971 | Weber | 210/230 |
| 3,878,102 | 4/1975 | Busse et al. | 210/230 |
| 3,915,863 | 10/1975 | Busse et al. | 210/230 |

*Primary Examiner*—William A. Cuchlinski, Jr.
*Attorney, Agent, or Firm*—Brady, O'Boyle & Gates

[57] ABSTRACT

A filter press is proposed wherein the number of chambers and the depth of each chamber are each significantly less than the corresponding parameters of conventional structures, yet the throughput of a press having a press volume which is only a small fraction of that of the conventional press bears favorable comparison with the throughput of that conventional press.

8 Claims, 5 Drawing Figures

REMOVAL OF MOISTURE FROM A SLUDGE SLURRY OR THE LIKE

The invention concerns a method of and a means for the removal of moisture from a sludge, slurry or the like by means of a filter press.

The press filtering of a sludge, slurry or the like, hereafter, for convenience, referred to simply as "sludge", is effected commercially by means of a recess-plate press or a membrane-plate press, liquid being removed by the filtering process and the residue remaining in the form of a coherent cake to be subsequently removed from the press upon the opening thereof.

In conventional filter presses, a relatively large number of press chambers is provided, and thus the space requirements of the press are appreciable, and the filling of such chambers, the subsequent opening of the press to remove the cakes therefrom and the readying of the press for a subsequent filling operation is a time-consuming operation which gives rise to a relatively long cycle time for the press, a significant proportion of such time being taken up by the opening and emptying operation due to the need to separate successive plates individually, by a distance of, say, 60cms., in order to provide access to the space between such plates for cake removal.

In conventional filter presses, cake compaction can be effected in one of two ways, according to the nature of the press. Thus, with a recess-plate press, filling of the chambers continues until a requisite level of compaction is achieved, the rate of filling reducing progressively as the degree of filling and compaction rises, firstly on account of the continually increasing resistance to further filling due to the need to compact material already in the chamber and secondly because of the filtering effect of material already present within the chambers. In the alternative structure, namely a membrane-plate press, the sludge is fed into chambers of which at least one wall is defined by a displaceable membrane, liquid being expressed from material in the chamber on completion of the filling operation by the application of pressure fluid to the back of the membrane to cause the same to move to compress material in the chamber and express liquid therefrom.

Whilst the cycle time for a membrane-plate press may well be less than that of a recess-plate of like capacity, such cycle time is still significant, and a substantial proportion of this time is accounted for by the time required to open and to empty the press and to ready the same for a further filtering process.

Hithertofore it has been believed that, in order to provide for an acceptable rate of throughput, the number of chambers should be relatively high and the depth of each chamber, as represented by the thickness of the cake to be formed therein, should be significant, and in the prior structures the number of chambers is say, in excess of forty and the depth of each chamber is generally within the range of 19 to 50 millimeters.

The present invention is predicated upon the appreciation that a like or an improved throughput relative to that of conventional presses can be achieved in certain circumstances utilising a press of fewer chambers than such conventional presses as are presently used and at a lower capital cost, and the primary object of the invention is to provide such a press.

Thus, according to the present invention there is proposed a filter press having a plurality of filter chambers, such chambers being not more than twenty in number and being of a depth not more than nineteen millimeters, means being provided adapted and arranged to effect physical compression of material in the chambers upon completion of the filling thereof.

According to a preferred feature, each filter chamber has single or multiple internal feeds, although in alternative structures single or multiple external feeds may be provided for each chamber.

According to a still further preferred feature, the press-plates are linked together, to facilitate simultaneous opening thereof, and such plates are preferably provided with release means to facilitate cake separation.

Hithertofore, filtration by producing thin cakes (that is to say cakes of less than 19mm thickness) has been thought impractical, as determined by an economically acceptable machine throughput, because of the inherent difficulty in removing thin cakes from the press chambers and in view of the large number of chambers involved in conventional presses.

The smaller number of chambers proposed by our invention, allied to the fact that the initiation of the opening of the various chambers can be effected simultaneously with a possibility of providing an automatic means for cake removal has shown that filtration by producing thin cakes cannot only be effected but is economically practical. Furthermore, physical compression of the material in the chamber leads to a drier cake and this, in its turn, assists in satisfactory cake removal by the automatic means.

One means for effecting physical compression of the material in the chambers comprises a membrane which defines one wall of the chamber and which is displaceable by fluid under pressure.

The invention also includes the method of filtering which comprises the steps of providing a press structure having a plurality, but not more than twenty, of press plates defining press chambers charging such structure with a sludge, slurry or the like, physically compressing material within the chambers to express liquid therefrom and form a coherent mass of not more than nineteen millimeters thickness, opening the press chambers, and removing the compacted cakes therefrom.

Preferably the physical compression of the material in the chambers is effected by displacing a respective membrane into pressure contact with material in the chambers by applying fluid under pressure to the reverse of such membrane, and the removal of the cakes from the chambers is effected simultaneously.

The invention will now be described further, by way of example only, with reference to the accompanying drawing illustrating one embodiment thereof and in which.

Figure 1:
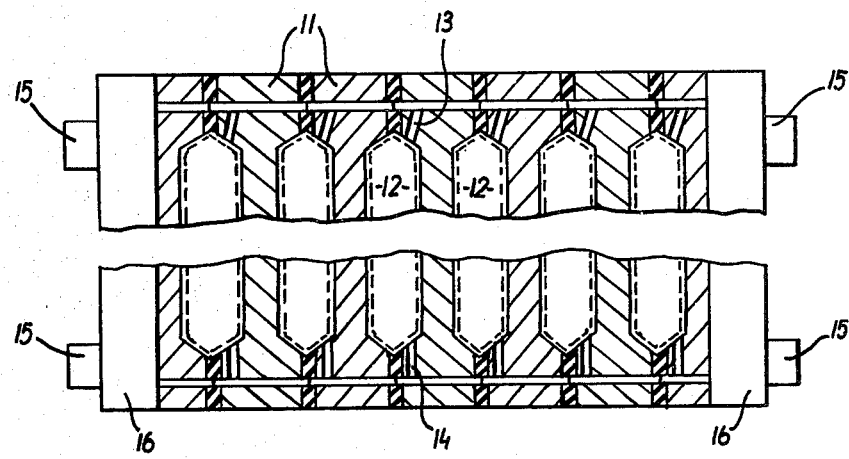
FIG. 1 is a diagrammatic longitudinal section through a filter press constructed in accordance with the invention.

Referring now to the drawings, and particularly to FIG. 1 thereof, a filter press comprises a plurality of plates 11 arranged in adjacent parallel disposition to define a number of press chambers 12 therebetween, there being feed inlets 13 and drainage outlets 14 to each chamber and the press further including a means 15 operating on the press ends 16 for applying a load to the press to accommodate the internal pressure applied by the sludge within the chambers 12 and to maintain an adequate seal against leakage at the periphery of the chambers.

In accordance with the invention the number of press chambers does not exceed twenty, in contradistinction to conventional filter presses of the general character of those here involved wherein up to, say, eighty chambers are provided, whilst the depth of the chambers does not exceed 19mms.

In the example illustrated, the number of filter chambers is six, whilst the depth of each chamber is 1cm.

In order to minimise press opening time, it is arranged that the various press chambers be open simultaneously and that a means is provided for facilitating cake separation or release.

As regards simultaneous press opening, it is to be understood that the word "simultaneous" when used in such context is intended to relate to the simultaneously open condition of the various press chambers when the press is opened to its full extent as distinct from an operation wherein the various chambers are all opened at one and the same time. In conventional practice the press chambers are opened in succession, but a given press chamber is closed before the opening of a succeeding chamber.

A comparison between the performance of a conventional membrane filter press having forty-five cavities each 5cms. deep and a press constructed as herein proposed with ten cavities each 1cm. deep has shown that a much improved throughput can be achieved at a significantly lower initial equipment cost, and, it is anticipated, a lower running cost.

Thus, in a typical operating situation, the conventional press as aforesaid operating in a normal manner and having a press volume of 2400 liters has a cycle time of 600 minutes, whereas the press of the invention operating as proposed and having a press volume of 125 liters has a cycle time of only 15 minutes, and thus a throughput of 5000 liters in 600 minutes.

At current market prices it is estimated that the cost of the press constructed and operating in accordance with the invention will be approximately two-thirds of that of the conventional structure, and that the cost/capacity ratio for the press as proposed will be 0.31:1 as compared with a ratio of 1:1 for the known structure.

As regards cake separation or release, it is proposed that a vibrator, shaker or other structure be provided for operable connection with the filter plates and cloths.

A suitable vibrator arrangement may comprise a bar extending longitudinally of the press from one press end and supported on a press side-bar, with a rubber buffer strip interposed therebetween. At its remote end the bar is connected with an electrical or mechanical vibrator. In order to apply the vibrator of the bar to the press plate, the latter has a handle extending laterally therefrom which rests on the bar, the motion of such bar thereby being transmitted to the plate to facilitate separation of the filter cake from the filter cloths which line the chamber.

A typical shaker will comprise a bar extending longitudinally of and above the press, one end of the bar resting on an edge cam which is adapted, upon rotation to oscillate the bar in a vertical plane.

Figure 3:
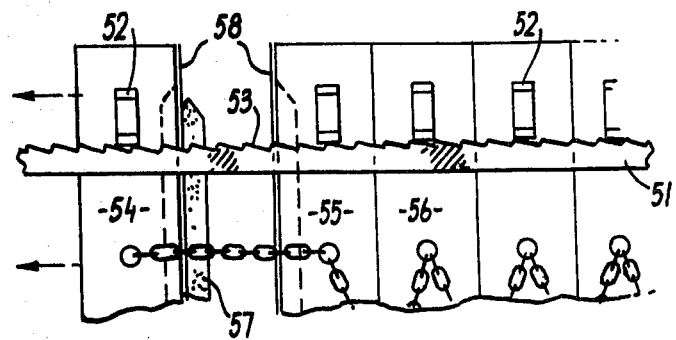
FIG. 3 is a diagrammatic side elevation of a means for use in assisting cake dislodgement or separation.

A further possible structure is shown diagrammatically in FIG. 3 and will be seen to comprise a notched bar 51 upon which press handles 52 rest and along which such handles 52 are drawn on opening of the press, movement of the handles across the notches 53 in the bar vibrating the plates 54, 55, 56, and dislodging the cakes 57 from the filter cloths 58.

In a still further arrangement, (not shown) provision is made to apply air under pressure to the rear face of a membrane to break the bond between the cake and such filter cloths.

In addition to the financial advantages arising directly from the application of the invention to a filter press, the space requirement of a press embodying the invention is much reduced as compared with that of a conventional press of a like throughput.

Figure 2A:
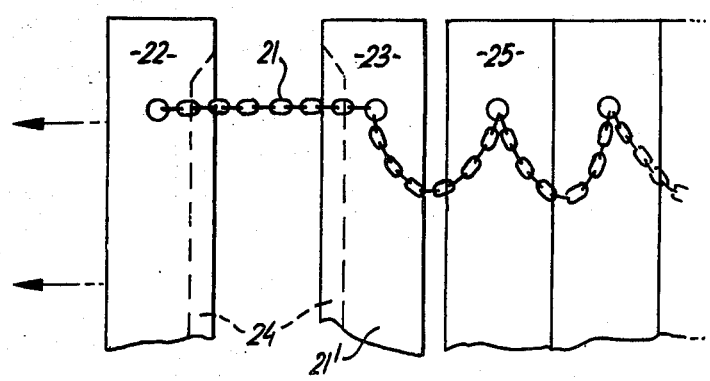
FIGS. 2a, 2b, 2c are diagrammatic side elevations, drawn to a larger scale, showing various alternative ways of connecting together adjacent press plates to ensure simultaneous press opening.

Referring now to FIG. 2a of the drawings, a means for effecting sequential opening of the various press chambers to give the 'simultaneous' opening before referred to comprises a chain linkage 21 connecting adjacent press plates 22, 23 displacement of a given plate 22 so as to open the chamber 24 defined by and between such plate 22 and the next adjacent plate 23 on operation of the press ram (not shown) in an appropriate sense moving the given plate 22 away from the said adjacent plate 23 to the limit imposed by the chain linkage 21 whereupon the said next adjacent plate 23 is itself moved away from the succeeding plate, 24, such latter movement continuing until the 'lost motion' of the chain linkage 21 between plates 23 and 25 is taken up. This sequence of operations continues until the press is fully open.

Figure 2B:
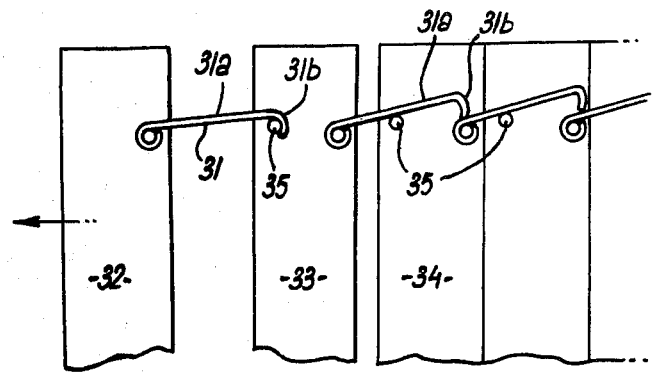

One alternative to the chain linkage of FIG. 2a is shown in FIG. 2b, where respective hook elements 31 pivotally mounted on the press plates 32, 33, 34 co-operate with respective lugs 35 on the next succeeding press plate, the shanks 31a of such elements bearing on the respective lugs 35 when the press is closed and the hook ends 31b thereof dropping into engagement with such respective lugs 35 when the related chamber is fully open, thereby to draw the next succeeding press plate away from that press plate with which it forms the next succeeding chamber.

Figure 2C:
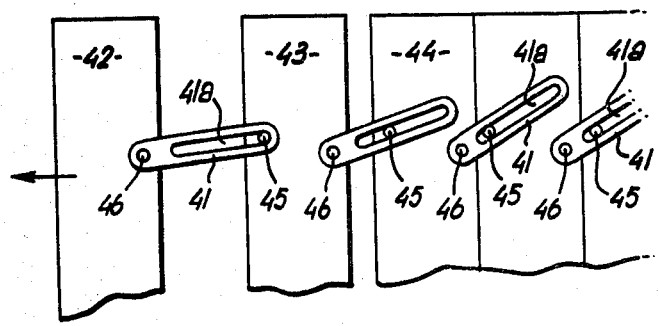

A second alternative is shown in FIG. 2c, the connection between successive press plates 42, 43, 44 comprising a respective linkage member 41 pivotally mounted on each press plate and captively engaged with a respective lug 45 on the next succeeding plate, the lug 45 engaging an elongate slot 41a in the linkage member 41, thereby to provide a 'lost motion' between the linkage member 41 and lug 45 corresponding to the requisite separation of the plates 42, 43, 44 in the open condition of the press, say from 5 to 12.5 cms., before movement of that plate 43 on which the lug 45 is provided.

Various other means for effecting sequential opening of the kind here specifically envisaged will readily present themselves to one skilled in the art.

As an alternative to the provision of a press having cavities of a depth of no more than nineteen millimeters, it is possible to use a press having cavities of a standard conventional depth and so to limit the extent to which such cavities are filled as to give an ultimate pressed cake of not more than nineteen millimeters thickness.

What we claim is:

1. A method of filtering which comprises the steps of providing a press structure having a plurality, but not more than twenty, of press plates defining press chambers, charging such structure with a sludge, slurry or the like, physically compressing material within the chambers to express liquid therefrom and form a coherent mass of not more than nineteen millimeters thickness when compressed, opening all of the press chambers simultaneously when said press structure is opened substantially to its full extent, and removing the compacted cakes therefrom.

2. The method as claimed in claim 1, wherein physical compression of the material in the chambers is effected by displacing a respective membrane into pressure contact with material in the chamber by applying fluid under pressure to the reverse of such membrane.

3. The method as claimed in claim 2, including the further step of subjecting the press plates when in or moving to a position appropriate to an open condition of the relative press chamber to a mechanical movement transverse to its direction of opening movement to facilitate cake separation.

4. The method as claimed in claim 1, including the further step of applying air under pressure to the rear face of a membrane to break the bond between the cake and such filter cloth and thereby facilitate cake separation.

5. A plate filter press having a plurality of vertically disposed filter plates defining less than twenty relatively shallow filter lined filter chambers and having membranes to effect physical compression of cake not more than nineteen millimeters in thickness in said chambers, means linking adjacent plates together for providing simultaneous opening of all of said chambers when the press is opened substantially to its full extent following a sequential one at a time opening of said chambers, and means for facilitating said cake to separate from said chambers as a consequence of the opening the press.

6. A filter press as claimed in claim 5, wherein the means linking together adjacent press plates includes a 'lost motion' device providing for relative motion between such adjacent plates to effect opening of the chamber therebetween before movement of that plate of the adjacent plates positioned upstream with respect to the direction of opening movement thereof.

7. A filter press as claimed in claim 5, wherein the said means for facilitating cake separation includes means coupled to said filter plates to provide vibratory movement thereof.

8. A filter press as claimed in claim 7, wherein the said means for facilitating cake separation additionally includes a notched bar in engagement at one end with said vibratory movement means and at the other end with the handles of the press plates.

* * * * *